June 28, 1955  E. A. ROCKWELL  2,711,635
TORQUE RELEASE LEVER CONSTRUCTION
Filed Aug. 24, 1951  4 Sheets-Sheet 3
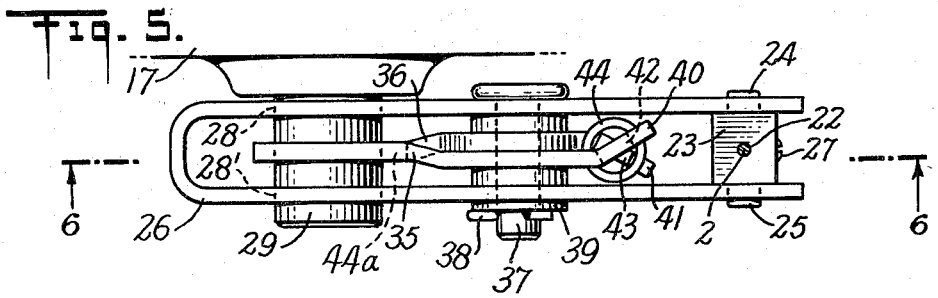
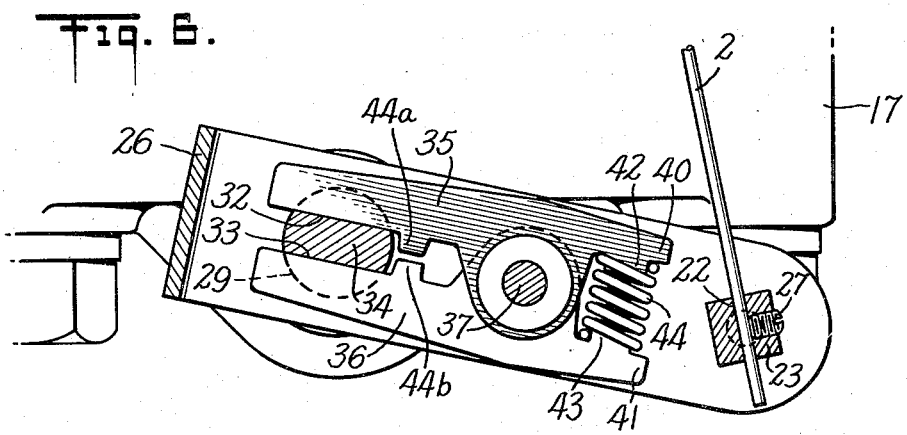
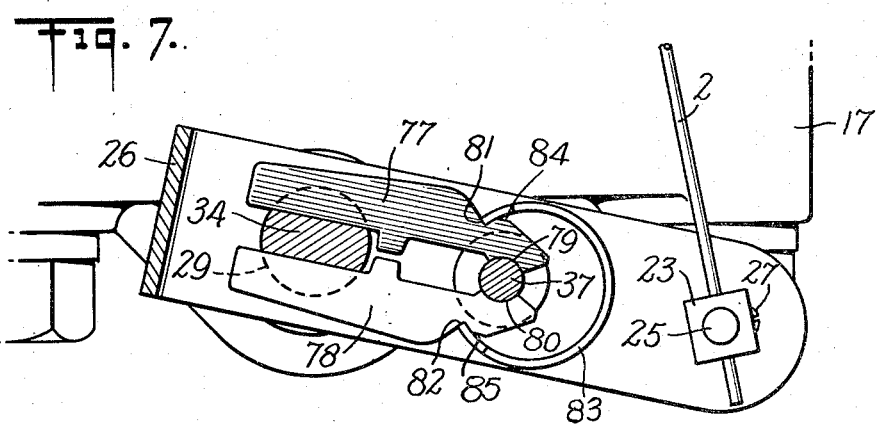
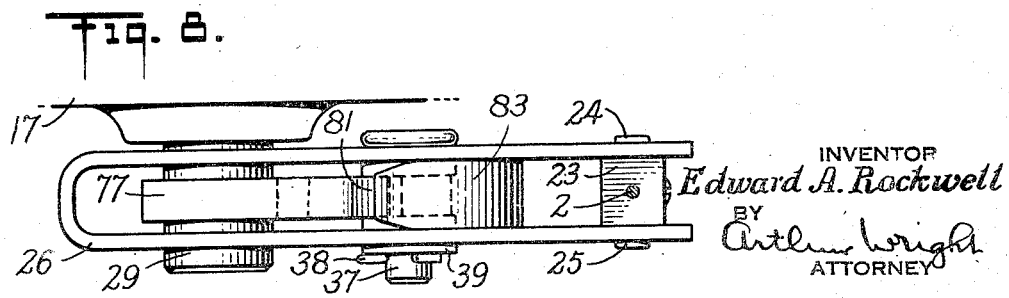
INVENTOR
Edward A. Rockwell
BY
Arthur Wright
ATTORNEY June 28, 1955     E. A. ROCKWELL     2,711,635
TORQUE RELEASE LEVER CONSTRUCTION
Filed Aug. 24, 1951                                    4 Sheets-Sheet 4

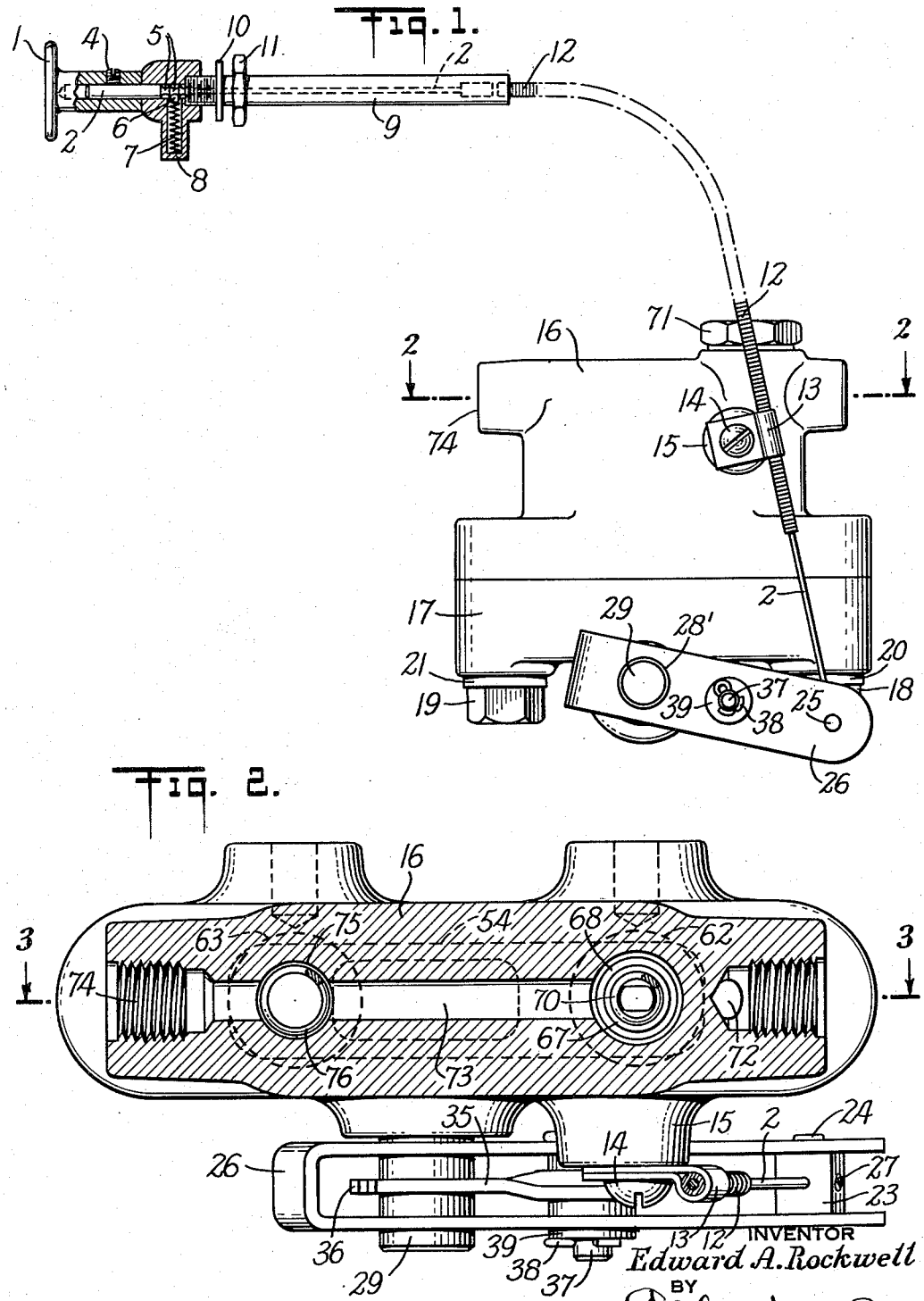

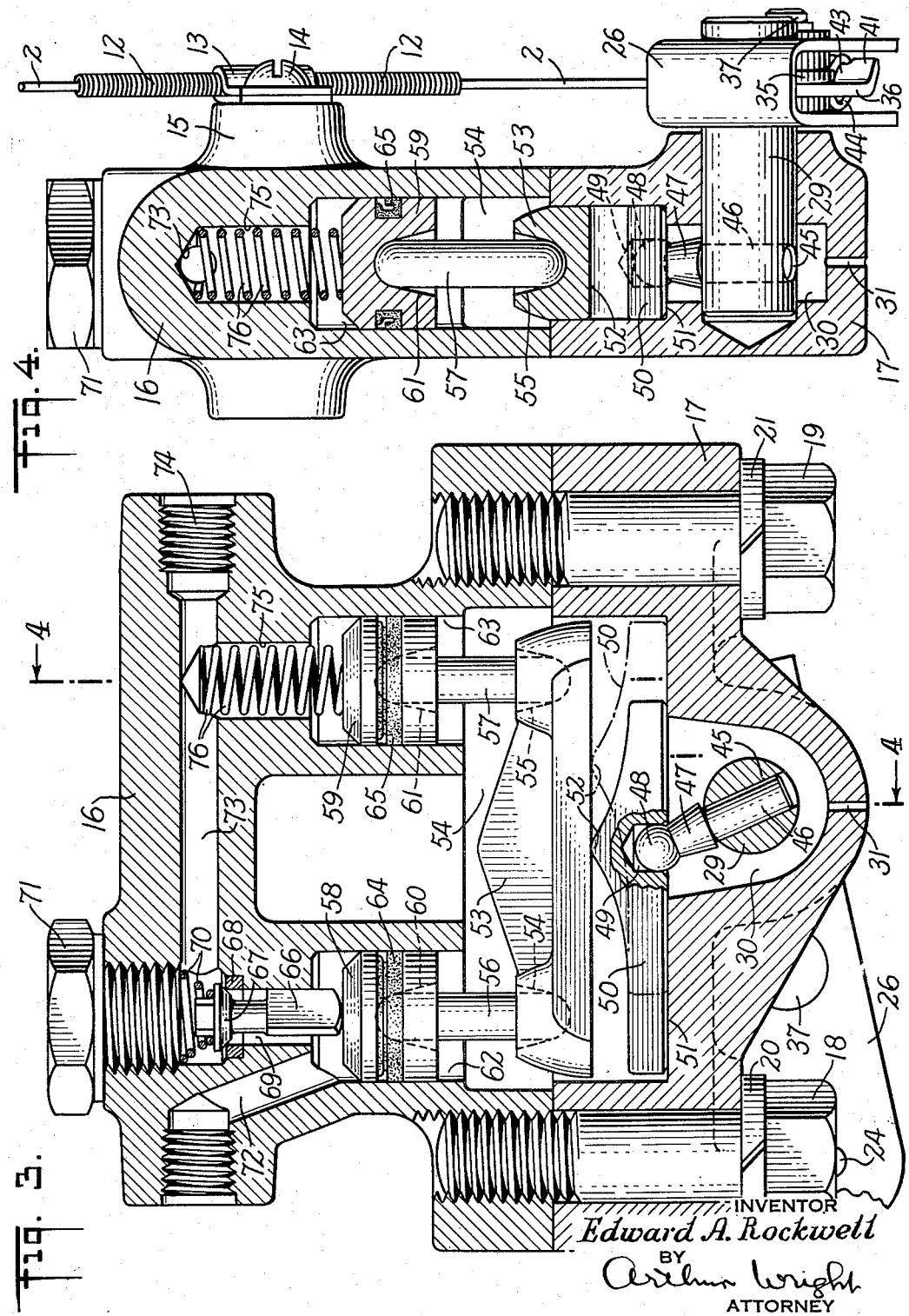

INVENTOR
Edward A. Rockwell
BY
Arthur Wright
ATTORNEY

United States Patent Office 2,711,635
Patented June 28, 1955

2,711,635

TORQUE RELEASE LEVER CONSTRUCTION

Edward A. Rockwell, West Los Angeles, Calif.

Application August 24, 1951, Serial No. 243,386

1 Claim. (Cl. 64—29)

My invention relates particularly to a mechanism for operating various devices wherein the mechanism may be called upon to overrun the position of a device actuated thereby or vice versa.

An object of my invention is to provide a controlling or adjusting mechanism for controlling the position of a device, which may be while under load, by means of which the said mechanism and device may at times assume different relative positions irrespective of the adjustments made by said mechanism. A further object is to provide an effective torque release mechanism to operate or control various devices. A further object is to provide an effective Bowden wire lost motion or release mechanism which may be used for controlling proportional pressure valves. An important further object is to provide a combined torque release lever and key for holding in position the lever on a shaft and to permit limited torque release, it being necessary only to "snap" the lever into an appropriate key way on a shaft, the movement of which is to be controlled.

Bowden wires are frequently used in connection with control devices which have end stop positions and it is an object to prevent over-stressing of the wire by permitting over running of the control lever after reaching the stop position.

This application is a continuation in part of my copending application upon Proportional Pressure Valve, filed August 24, 1951, Ser. No. 243,385.

While my invention is capable of being carried out in many different ways, by way of illustration I have shown certain forms thereof in the accompanying drawings, in which—

Fig. 1 is a side elevation of a proportional pressure valve made in accordance with my invention;

Fig. 2 is a plan view thereof;

Fig. 3 is a vertical section thereof taken on line 3—3 of Fig. 2;

Fig. 4 is a vertical section of the same taken on line 4—4 of Fig. 3;

Fig. 5 is a plan view of the lost motion adjusting lever shown in Fig. 1 and at the right of Fig. 4;

Fig. 6 is an enlarged side elevation of the proportional pressure valve taken from the right side of Fig. 4 but showing the adjusting lever in section taken on line 6—6 of Fig. 5;

Fig. 7 is a vertical section of a modified form of a lost motion adjusting lever;

Fig. 8 is a plan view of the same;

Figure 9:
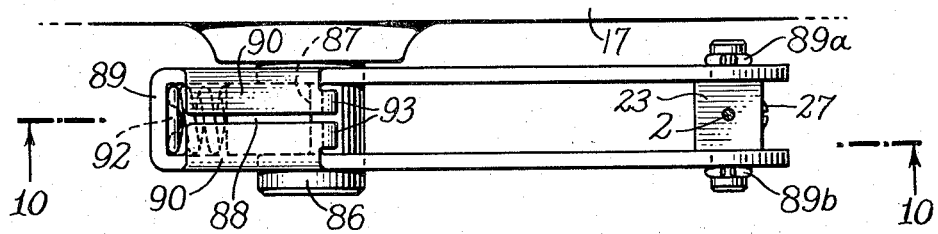
Fig. 9 is a plan view of another modification of adjusting lever arrangement.

In the drawings, referring to Figs. 1 to 6, I have shown a handle 1 adapted to be mounted, for instance, on the dash of an automobile, not shown, which has a centrally located longitudinal recess or hole for receiving one end of a Bowden wire 2 held in place in the handle 1 by a set screw 4 so that the Bowden wire 2 may be adjusted outwardly or inwardly manually with regard to the said dash inasmuch as the said wire 2 carries a series of annular recesses 5 cooperating with a ball 6 pressed upwardly by a spring 7 in a cylinder 8, on an internally screw-threaded bracket screwed onto an externally screw-threaded tube 9 passing through the dash and having thereon a washer 10 and a locking nut 11 for holding the same in place. On the inner end of the tube 9 there is supported or fastened in any desired manner a flexible metal conduit 12 of the usual kind around the Bowden wire 2. The metal conduit 12 is held in place at its other end by a split clamp 13 fastened by a screw 14 to a boss 15 on an upper valve casing 16, which is secured to a lower valve casing 17 by screws 18 and 19 having lock washers 20 and 21.

The lower or inner end of the Bowden wire 2 is tightly fastened in a hole 22 to a swivel bearing 23 having reduced ends 24 and 25 pivotally received in the two outer ends of a U-shaped adjusting lever 26. A set screw 27 secures the Bowden wire 2 in the swivel bearing 23. The inner U-shaped end of the lever 26 has circular openings 28 and 28' to pivotally support this end of the lever 26 on a shaft 29 carried in the lower valve casing 17 in a recess 30 having an oil drain 31. Furthermore, on the said shaft 29 there are two segmental opposed recesses 32 and 33 forming a squared or flat portion 34 on the shaft 29. This flat portion 34 is releasably engaged on the opposite sides thereof by levers 35 and 36 respectively, located on a pivot pin 37 carried in the two ends of the U-shaped adjusting lever 26 and held therein by means of a cotter pin 38 and a washer 39. These two levers 35 and 36 also have crossed rear ends 40 and 41 with tongues 42 and 43 thereon to hold in place a spring 44 pressing the rear ends normally apart, so as to hold the two levers 35 and 36 releasably and yieldingly against the flat portion 34 of the shaft 29. Lugs 42 and 43 prevent the spring 44 from escaping.

The said shaft 29, furthermore, has within the casing 17 a transverse hole 45 to receive tightly therein a rocker pin 46 provided at its upper end with a tapered flange 47 carrying at the top thereof a spherical knob 48 which is received in a recess 49 in the underside of a shiftable pivot plate 50 sliding on a horizontal surface 51 within the casing 17. The pivot plate 50 has on its upper side an adjusting rocker edge 52 for supporting pivotally a lever 53 located in the lower casing 17 but extending into a chamber 54 in the upper casing 16. This lever 53 has at its two ends, respectively, sockets 54 and 55 which receive, respectively, the lower ends of piston rods 56 and 57, which support at their upper ends pistons 58 and 59, by means of sockets 60 and 61, located in cylinders 62 and 63, in the upper valve casing 16. The pistons 58 and 59 have U-shaped seals 64 and 65. The piston 59 is particularly arranged so as to have ample clearance from the casing 16 during the release of the pressure liquid.

Above the piston 58 there is a triangular valve stem 66 carrying a valve 67 operating on a valve seat ring 68 in a valve passageway 69, the valve 67 being urged towards its seat 68 by a spring 70 supported on a screw plug 71 in the casing 16.

The valve 67, 68 controls the delivery of the pressure fluid or liquid at the desired pressure through a passageway or port 72 to the front wheel brakes (not shown) or any other device to be operated thereby. The valve 67, 68 is normally held open by the piston 58 so as normally to supply the pressure fluid to the delivery port 72 from a horizontal inlet passageway 73 having an inlet port 74 which leads to the rear wheel brakes and likewise to the usual pedal-operated master cylinder (not shown). The inlet passage 73, furthermore, has a branch passage 75 carrying a spring 76 which normally presses downwardly the piston 59 so as thereby to normally unseat the valve 67.

Referring to Figs. 7 and 8, on the said shaft 29, instead of the levers 35 and 36 there are provided two wide clamping jaws 77 and 78 carried within the U-shaped adjusting lever 26 the rearward ends of which are still wider and provided with semi-cylindrical recesses 79 and 80, respectively, fitting over the pivot pin 37, the said two jaws 77 and 78 being releasably spring-pressed toward each other by a split spring ring 83 the ends of which are carried in notches 81 and 82 on the outside of the jaws 77 and 78, and which is prevented from escaping by spaced lugs 84 and 85 on the two jaws 77 and 78.

Figure 10:
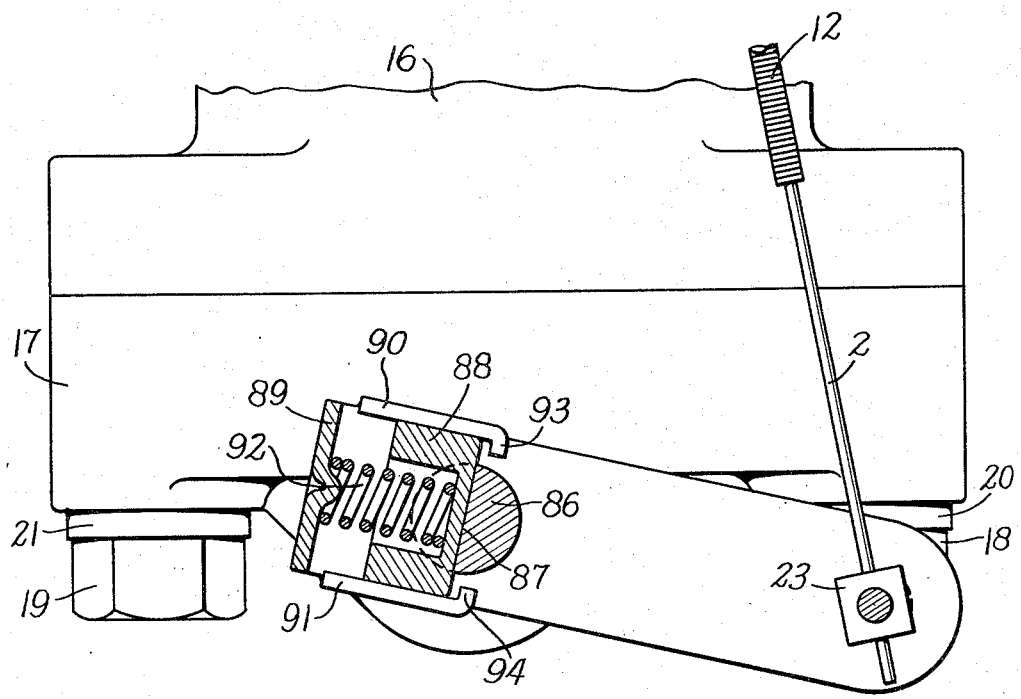
Fig. 10 is a vertical section thereof on line 10—10.

In Figs. 9 and 10 another modified form of the controlling lever mechanism is shown. This comprises a shaft 86, operating substantially like the shaft 29, and which has a flat keyway 87 on one side thereof to receive a key in the form of a block 88 slidably carried between the two side members of a U-shaped adjusting lever 89, connected to the swivel bearing 23 by snap rings 89a and 89b. Each of the said two side members has a pair of ears 90 and 91 to retain in place the sliding block or key 88 which is pressed into the keyway 87 by a biased spring 92 held in position by an indentation in the U-shaped lever 89. Lugs 93 and 94 on the ears 90 and 91 retain the sliding block 88 in place when the lever 89 is removed from the shaft 86 but allow a slight clearance from the sliding block 88 when the key 88 engages the keyway 87.

In the operation of the apparatus, referring to Figs. 1 to 6, the master cylinder liquid supplied by manual pressure will operate the rear wheel brakes and simultaneously will be received in the inlet port 74 and passageway 73 and, accordingly, will be delivered by the normally open valve 67, 68 to the front wheel brakes through the port 72. The pressure at which the liquid is delivered to the front wheel brakes will, however, depend upon the adjustment of the pivotal edge 52, the change in position of which is made by the handle 1 on the dash of the automobile. By the change in the position of the pivotal edge 52 the relative lengths of the lever arms between the said edge 52 and the respective plungers 58 and 59 can be adjusted so as to deliver a pressure to the front brakes by the port 72 having the desired proportion to the pressure at the inlet port 74 for operating the rear brakes, or other devices to be operated. In other words, the fluid pressure delivered to the front brakes will be cut off from the inlet passageway 73 when the front brake pressure has reached the proportion of the rear brake fluid pressure determined by the adjusted position of the pivot edge 52. However, upon the decrease or release of the master cylinder pressure the valve 67 will again be opened.

At any time, a setting or selection may be made, of the Bowden wire 2, by sliding the pivot plate 50 by means of the spherical knob 48 into any desired new position. Furthermore, if there is any undue relative force exerted from the Bowden wire 2 on the shaft 29, or vice versa, the yielding or lost-motion connection between the levers 35 and 36, each of which acts as a yieldable transverse key, and the keyway formed by the flat portion 34 of the shaft 29, forming a part of the device to be controlled, will permit relative movement between the same, so as to prevent breakage of the parts. This arrangement permits the positioning of the device to be controlled so as to permit the key to over run the said device when the latter is moved to a stop position, comprising either the stop position at the end of the possible movement of the device or the stop position produced by a load condition.

In Figs. 7 and 8, the clamping jaws 77 and 78 operate as a spring-pressed yielding releasable lost-motion connection substantially the same as in the case of the levers 35 and 36.

In Figs. 9 and 10 the sliding block 88 engages the flat keyway 87 releasably substantially as in the case of the other forms of key and keyway shown in the preceding figures.

In all of these forms, it will be noted that each key operated by the spring 44 or spring 83 or spring 92 is accessibly mounted within its particular lever so as to be capable of manual release from any given position at any time, so that such release can be effected without turning the keyway shaft, when removing or replacing the U-shaped lever.

While I have described my invention above in detail I wish it to be understood that many changes may be made therein without departing from the spirit of the same.

I claim:

A lever assembly for use with a device to be controlled of the type having a pair of diametrically opposed flat transverse keyways on a shaft for controlling the said device through a range of movement of the shaft, said lever assembly comprising a U-shaped lever pivotally mounted on said shaft, a pivot mounted on said lever between the legs of the U, a pair of arms pivotally mounted on said pivot and engaging the flat keyways, and a C-shaped spring biasing the arms into engagement with said flat keyways.

References Cited in the file of this patent

UNITED STATES PATENTS

| Number | Name | Date |
|---|---|---|
| D. 107,752 | Dom | Jan. 4, 1938 |
| 497,815 | Porter | May 23, 1893 |
| 706,592 | Parker | Aug. 12, 1902 |
| 863,687 | Abbott | Aug. 20, 1907 |
| 1,200,514 | Miller | Oct. 10, 1916 |
| 1,311,394 | Hawley | July 29, 1919 |
| 1,323,392 | Hoting | Dec. 2, 1919 |
| 1,427,684 | Grieves | Aug. 29, 1922 |
| 1,568,062 | Edmond | Jan. 5, 1926 |
| 2,060,325 | Kritz | Nov. 10, 1936 |
| 2,093,321 | Kempton | Sept. 14, 1937 |
| 2,136,023 | Russell | Nov. 8, 1938 |